United States Patent [19]

Miyakoshi

[11] Patent Number: 4,690,235
[45] Date of Patent: Sep. 1, 1987

[54] THREE-WHEELED MOTOR VEHICLE
[75] Inventor: Shinichi Miyakoshi, Saitama, Japan
[73] Assignee: Honda Giken Kogyo Kabushiki Kaisha, Tokyo, Japan
[21] Appl. No.: 795,628
[22] Filed: Nov. 6, 1985
[30] Foreign Application Priority Data Nov. 6, 1984 [JP] Japan ................................ 59-233840
Nov. 8, 1984 [JP] Japan ................................ 59-235907

[51] Int. Cl.⁴ .............................................. B62D 61/06
[52] U.S. Cl. ...................................... 180/210; 180/900
[58] Field of Search ................... 180/210, 211, 21, 900
[56] References Cited
U.S. PATENT DOCUMENTS 2,230,749 2/1941 Hebert .................................. 180/210
2,455,404 7/1969 Hansen ................................. 180/210
2,740,486 4/1956 Wayman ............................. 180/210
3,298,453 1/1967 Bobard ................................ 180/211

FOREIGN PATENT DOCUMENTS 904447 8/1962 United Kingdom ................. 180/210

Primary Examiner—John J. Love
Assistant Examiner—Ross Weaver
Attorney, Agent, or Firm—Irving M. Weiner; Joseph P. Carrier; Pamela S. Burt

[57] ABSTRACT

A motor vehicle having a steering handle, a rider's seat disposed behind the steering handle, a front wheel disposed in front of the steering handle and steerable by the steering handle, a rear wheel disposed behind the rider's seat, an engine for driving at least the rear wheels, and a side runner. The front and rear wheel are held in substantial alignment with each other along an axis. The side runner is disposed between the front and rear wheels as seen in side elevation and spaced transversely from the axis. The motor vehicle also has a steering mechanism for steering the side runner in coaction with the front wheel, and a structural body supporting the front and rear wheels and the side runner and defining a space located between the axis and the side runner and opening in the longitudinal direction of the motor vehicle.

16 Claims, 17 Drawing Figures

PRIOR ART

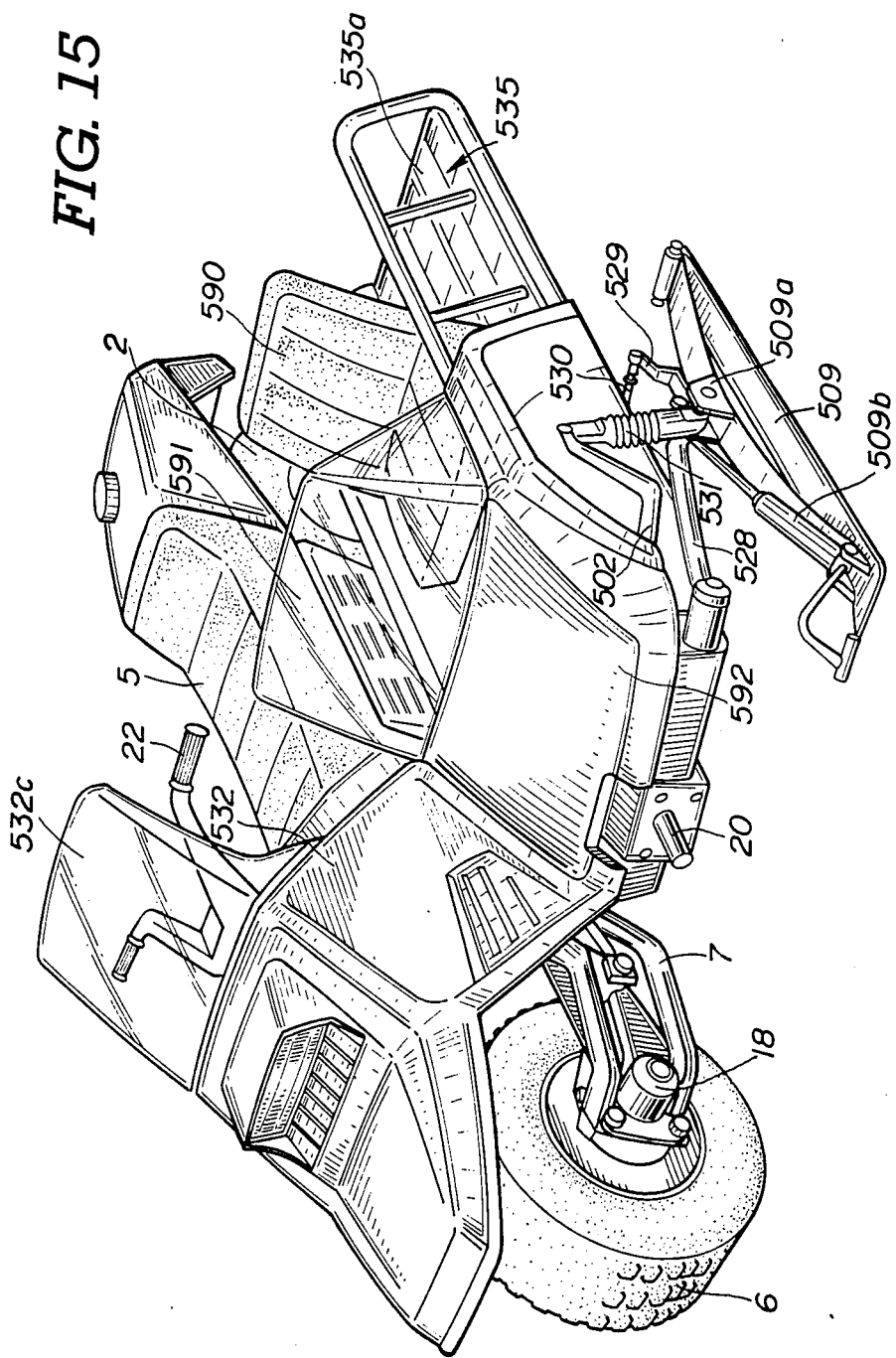

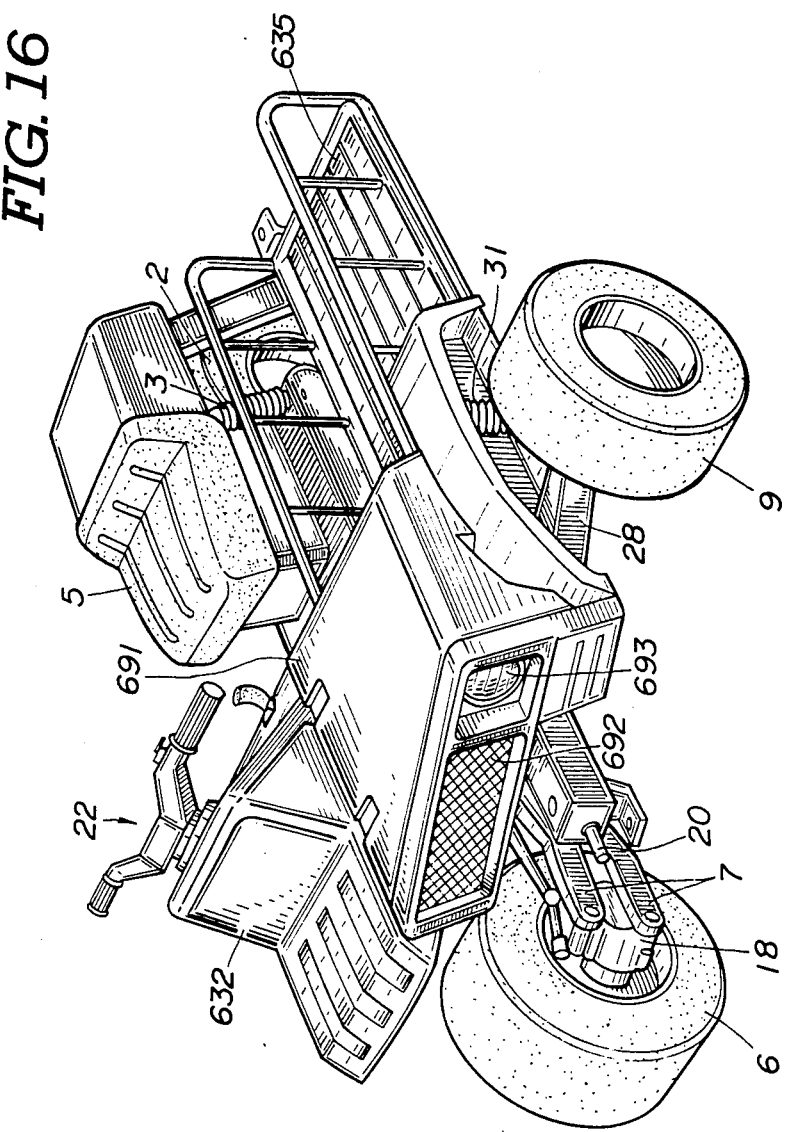

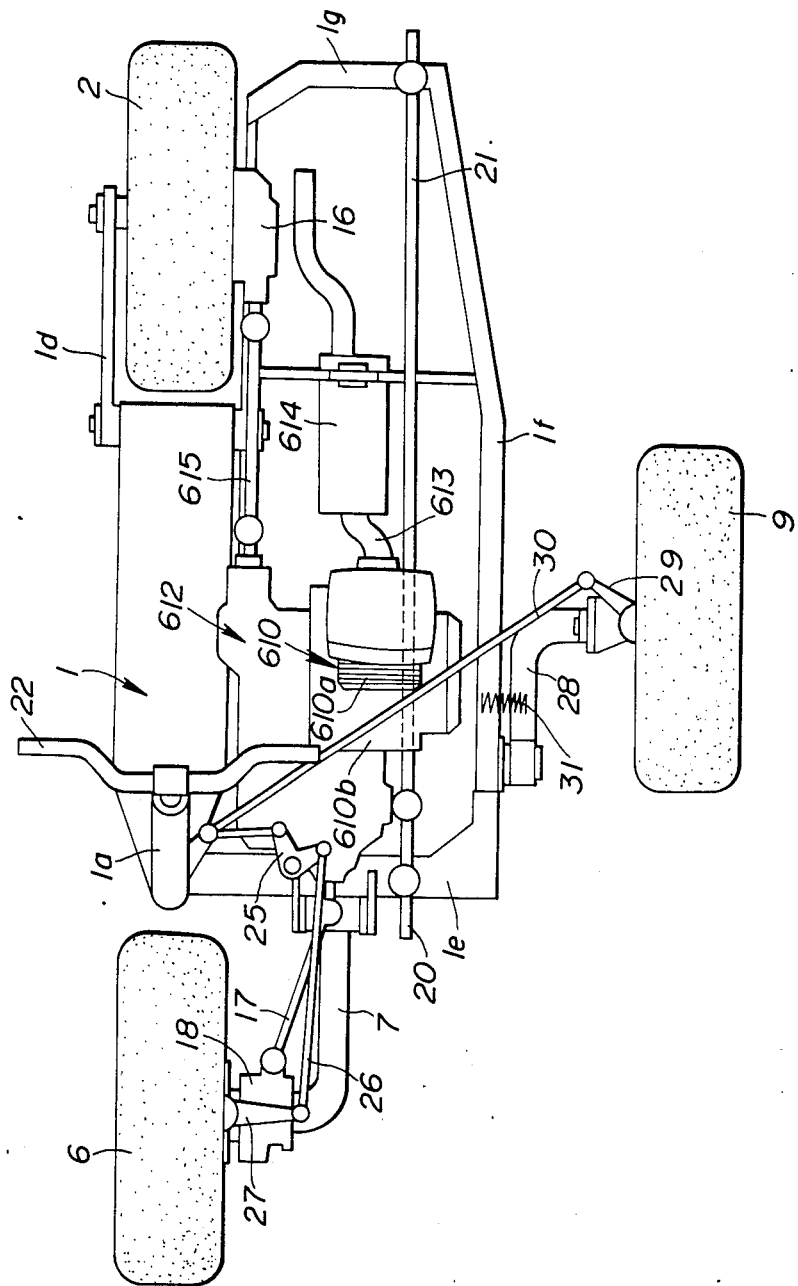

THREE-WHEELED MOTOR VEHICLE

BACKGROUND OF THE INVENTION

1. Field of the Invention

The present invention relates to a three-wheeled motor vehicle for use as a multipurpose working machine.

2. Description of Relevant Art

Three- and four-wheeled motor vehicles are generally used as passenger vehicles and working machines.

Where four-wheeled motor vehicles or working machines are employed for cargo transportation, the operator or worker rides on the vehicle at one side or the center thereof with a space behind the operator being used for storage of the cargo. Therefore, the storage space or utility space on the four-wheeled motor vehicle for cargo transportation is reduced by the presence of the operator. In order to enlarge the storage space, the length of the vehicle frame must be increased, so that the vehicle frame is large in size as compared with the storage space.

Four-wheeled motor vehicles are also used as lawn mowers and agricultural working machines for forming furrows in the field and cultivating the soil. With such four-wheeled motor vehicles, the effective space thereon includes a space where the operator rides for driving the vehicle. Since any working attachment such as a rotor or the like cannot be installed on the operator space, it should be mounted on the vehicle frame as its front or rear end. The vehicle frame with the working attachment installed makes the motor vehicle relatively long and large, with the result that the motor vehicle cannot be well maneuvered such as when it is to be turned. Particularly, the four-wheeled agricultural working machines have proven unsatisfactory in that they cannot make turns of small radii which are often required in the field.

Where a snowplow is of a rider-controlled four-wheeled design, it is also relatively large in overall size since a space is required on the snowplow for the rider or operator to ride on and control the snowplow while a snow auger or blower is attached to the front or rear end of the snowplow frame.

Three-wheeled motor vehicles having a single front wheel and two rear wheels have been put to use as various working machines. Since the operator rides centrally on the motor vehicle, any cargo storage space or bed to be provided thereon has to be located behind the operator. If the longitudinal dimension of the motorcycle frame is to be fixed, then the cargo storage space will be relatively small. If the cargo storage space is to be enlarged, then the cargo storage bed will be extended rearwardly, making the overall size large. In case the cargo storage bed is located in front of the operator's seat, a limitation is imposed on the size of the cargo storage bed by desired drivability and maneuverability of the motor vehicle.

Where such a three-wheeled motor vehicle is used as an agricultural working machine, the front wheel positioned centrally between the rear wheels, as seen longitudinally of the motor vehicle, tends to ride on and break a ridge formed on the field between the rear wheels. Any working attachment such as a rotor has to be connected to the rear end of the vehicle frame, and hence increases the longitudinal dimension and the overall size of the motor vehicle.

The present invention has been made in an effort to eliminate the drawbacks with the conventional three- and four-wheeled motor vehicles used as various working machines.

SUMMARY OF THE INVENTION

It is an object of the present invention to provide a three-wheeled motor vehicle which has a large utility space substantially coextensive with the transverse and longitudinal dimensions of the motor vehicle for storing cargo or supporting a working unit or attachment, is small in size even with the working attachment installed, can make small turns, can be maneuvered well on rough terrain, and is simple in structure.

To achieve the above object, there is provided a motor vehicle comprising a steering handle, a rider's seat disposed behind the steering handle, a front wheel disposed in front of the steering handle and steerable by the steering handle, a rear wheel disposed behind the rider's seat and substantially aligned with the front wheel along an axis, an engine for driving at least the rear wheel, a side runner disposed between the front and rear wheels as seen in side elevation and spaced transversely from the axis of the front and rear wheels, a steering mechanism for steering the side runner in coaction with the front wheel, and a structural body supporting the front and rear wheels and the side runner and defining a space located between the axis and the side runner and opening in the longitudinal direction of the motor vehicle.

A rider rides on the motor vehicle between the front and rear wheels, and the space between the axis thereof and the side runner opens in the longitudinal direction. Therefore, a cargo bed or a working unit can be disposed between the axis and the side runner and extend fully in the longitudinal dimension of the motor vehicle. Therefore, the motor vehicle can provide a large utility space while remaining small in size. Since the side runner is steerable in coaction with the front wheel, the motor vehicle can make small turns and hence can be maneuvered well on rough terrain. As a consequence, a small-size, rider-controlled cargo transportation vehicle or working machine can be provided which has a required large-size utility space thereon.

The above and further objects, details and advantages of the present invention will become apparent from the following detailed description of preferred embodiments, when read in conjunction with the accompanying drawings.

BRIEF DESCRIPTION OF THE DRAWINGS

FIG. 15 is a perspective view of a three-wheeled motor vehicle according to a fourth embodiment of the present invention, the motor vehicle being used as a snowmobile;

FIG. 16 is a perspective view of a three-wheeled motor vehicle according to a fifth embodiment of the present invention, the motor vehicle being used as a cargo transportation vehicle with an engine differently positioned; and FIG. 17 is a plan view similar to FIG. 3, primarily illustrating a drive mechanism.

DETAILED DESCRIPTION OF THE PREFERRED EMBODIMENTS

Figure 1:
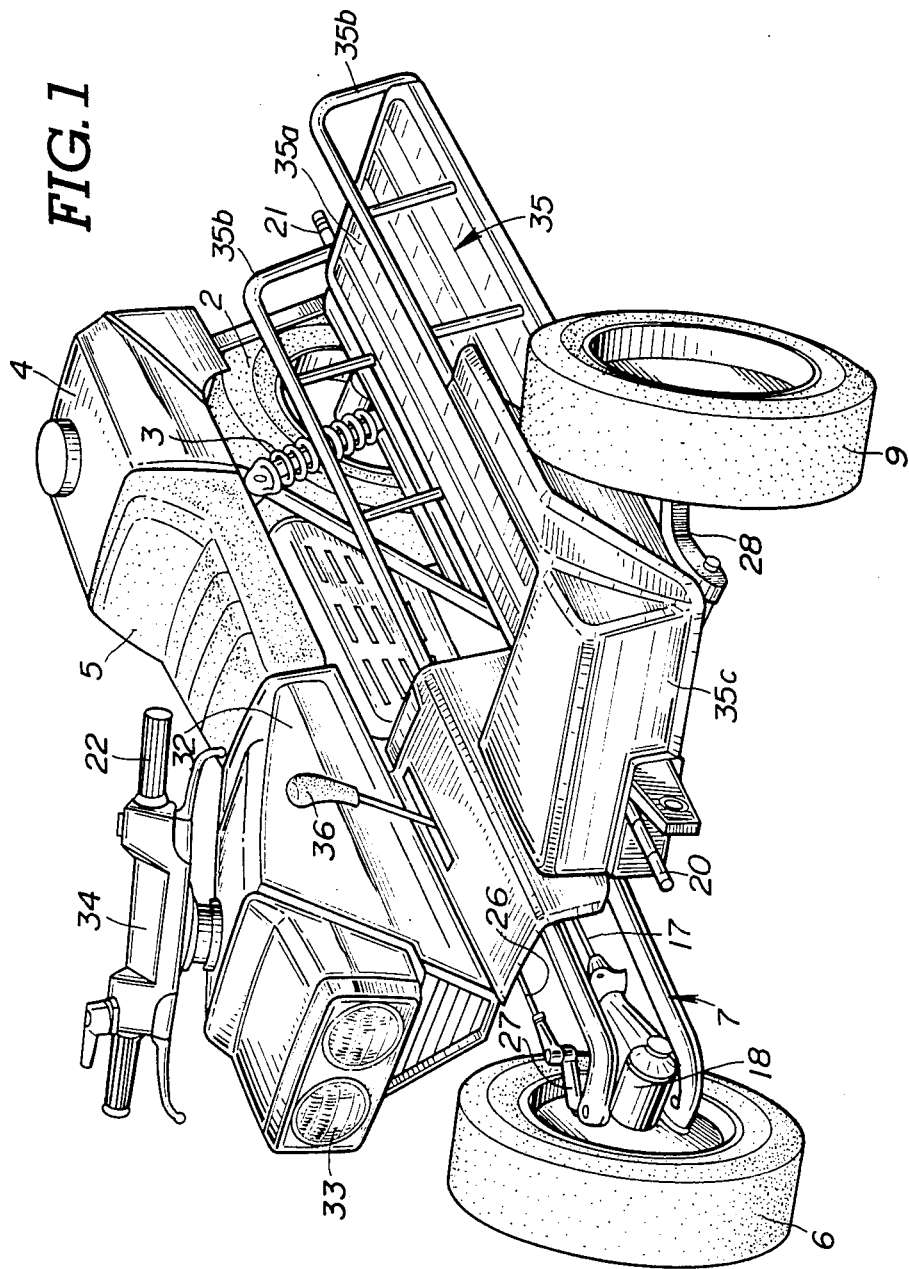
FIG. 1 is a perspective view of a three-wheeled motor vehicle according to a first embodiment of the present invention, the motor vehicle being used as a cargo transportation vehicle.
Figure 2:
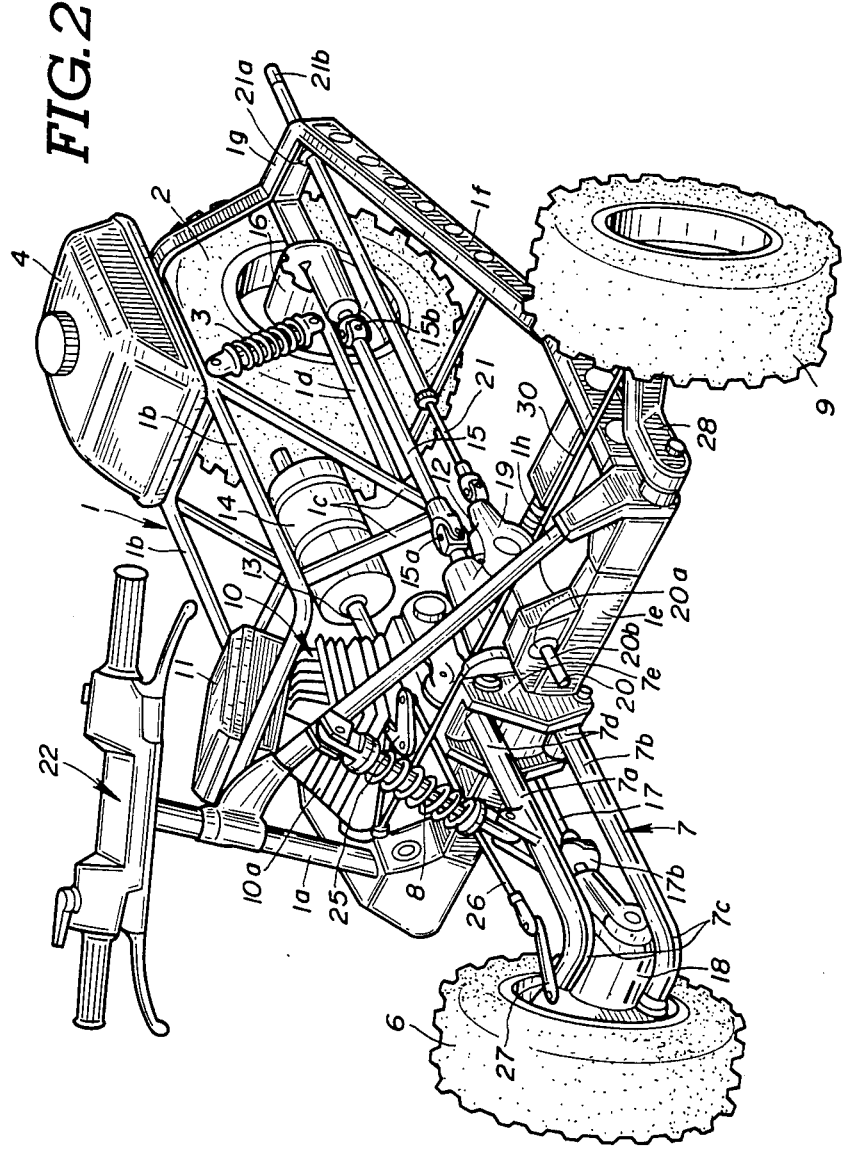
FIG. 2 is a perspective view of the three-wheeled motor vehicle of FIG. 1, with a cover, a seat, and a cargo bed omitted from illustration.

As shown in FIGS. 1 and 2, a three-wheeled motor vehicle according to a first embodiment of the present invention is used primarily as a cargo transportation vehicle and may also be used as an agricultural working machine with attachments. The motor vehicle includes a frame 1 having two upper members 1b, 1b extending rearwardly from the upper end of a head tube 1a. Submembers 1c, 1c extend downwardly in a V shape from the central portion of each of the upper members 1b, 1b. A rear wheel 2 is supported on a rear fork 1d pivotally coupled to the submembers 1c, 1c. A cushioning unit 3 is disposed on each side of the frame 1 and connected between the rear fork 1d and the upper member 1b.

A transversely extending lower cross member 1e has one end coupled to the lower end of the head tube 1a. A lower side member if extends rearwardly from the other end of the lower cross member 1e toward the rear wheel 2. The lower side member if has an output shaft supporting portion 1g bent transversely inwardly. A submember 1h extends as an oblique beam between the upper end of the head tube 1a and the other end of the lower cross member 1e. A fuel tank 4 is supported on the upper members 1b, 1b above the rear wheel 2, and a rider's seat 5 is disposed in front of the fuel tank 5 as shown in FIG. 1.

A front wheel 6 is disposed in front of the head tube 1a and substantially aligned with the rear wheel 2 in the longitudinal direction of the frame 1. The front wheel 6 is supported at one side thereof on a leading arm assembly 7 comprising upper and lower leading arms 7a, 7b extending forwardly from an intermediate portion of the lower cross member 1e. The leading arms 7a, 7b have ends 7d, 7d pivotally coupled by a bracket 7e to the lower cross member 1e so as to be kept parallel to each other. A cushioning unit 8 is connected between an intermediate portion of the upper arm 7a and an upper portion of the submember 1h. The leading arms 7a, 7b have outwardly bent front ends 7c on which the front wheel 6 is supported.

A side wheel 9 is supported on the end of the lower cross member 1e remote from the head tube 1a. The side wheel 9 being idly rotatable. Between the side wheel 9 and the front and rear wheels 6, 2, there is defined a longitudinally open space flanked on one side thereof with a region where a rider rides between the front and rear wheels 6, 2 astride of the rider's seat 5.

Figure 3:
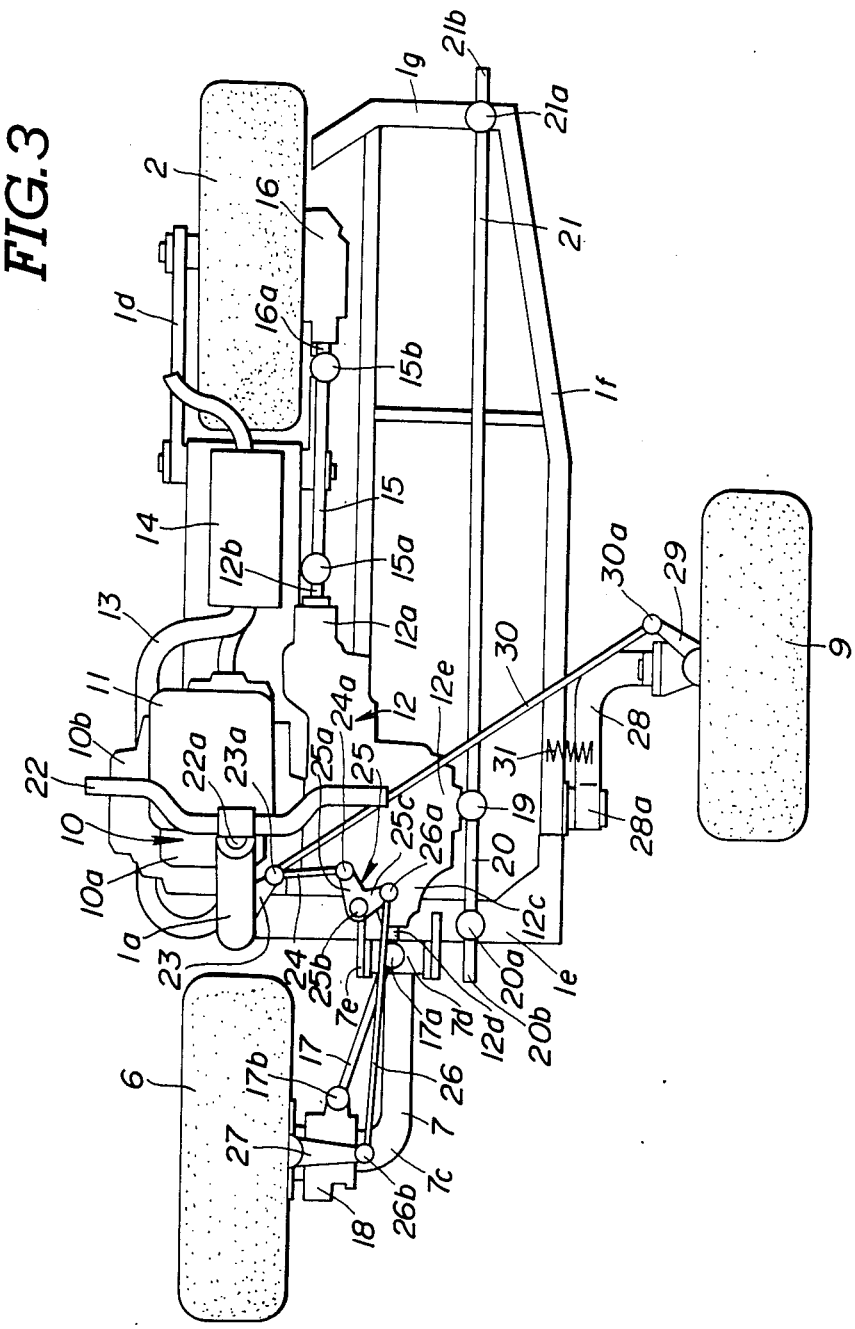
FIG. 3 is a plan view of a drive mechanism and a steering mechanism of the motor vehicle of FIG. 1.
Figure 4:
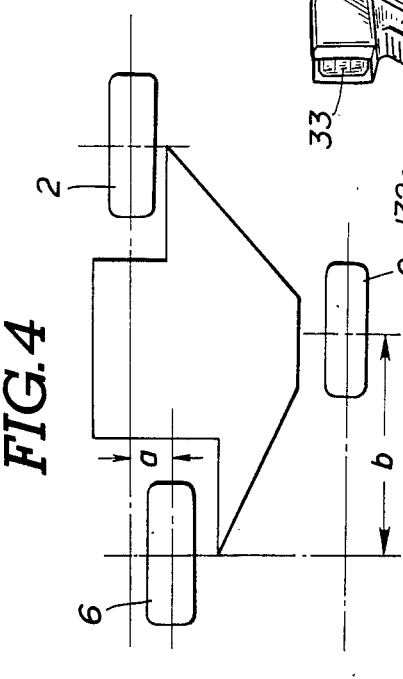
FIG. 4 is a schematic view showing the relationship between the front, rear and side runner wheels.

While the front and rear wheels 6, 2 are shown in FIGS. 1 through 3 as being substantially aligned longitudinally of the frame 1, the front wheel 6 may be displaced or offset inwardly from the rear wheel 2 by a desired distance a as shown in FIG. 4. The side wheel 9 may also be displaced or offset rearwardly from the front wheel 6 by a desired distance b.

An engine 10 is supported on the frame 1 behind the head tube 1a and in front of the upper members 1b, 1b.

An air cleaner 11 is disposed over the engine 10 and has an upper half portion projecting above the front portions of the members 1b, 1b. The engine 10 has a cylinder unit 10a and a crankcase 10b (FIG. 3) therebelow. A transmission case 12 is positioned inwardly of the crankcase 10b and faces through the space toward the side wheel 9. An exhaust pipe 13 connected to the front portion of the engine 10 is bent rearwardly to lie on an outer side of the engine 10 and connected to a muffler 14 placed between the rear wheel 2 and the engine 10. In the foregoing frame arrangement, the engine 10 is positioned just behind the head tube 1a and between the front and rear wheels 6, 2, while the transmission case 12 is disposed sideways of the engine 10. Therefore, various accessories to the engine 10 can easily be positioned, and the muffler 14 is not required to be located on one side of the engine 10. Since the transmission case 12 is positioned on one side of the engine 10, the height of the engine 10 can be lowered and hence the frame 1 can have an increased height from the ground. As a consequence, the three-wheeled motor vehicle can also be used advantageously as an agricultural working machine, a lawn mower, or the like.

As shown in FIG. 3, the front and rear wheels 6, 2 can be driven by the engine 10 through a shaft drive mechanism described below. A first output shaft 12b extending rearwardly from a rear portion 12a of the transmission case 12 is coupled to a propeller shaft 15 by a universal joint 15a. The propeller shaft 15 extends rearwardly and is coupled by a universal joint 15b to the input shaft 16a of a gear box 16 disposed inwardly of the rearwheel 2 and connected thereto.

A second output shaft 12d extends forwardly from a front, transversely intermediate portion 12c of the transmission case 12 and is coupled to a propeller shaft 17 by a universal joint 17a. The propeller shaft 17 extends obliquely forwardly toward the front wheel 6 and is connected by a universal joint 17b to a gear box 18 located sideways of the front wheel 6. The gear box 18 can be angularly moved by a knuckle arm 27 as the front wheel 6 is steered, as described later.

Another gear box 19 is disposed on one side 12e of the transmission case 12 which is remote from the engine 10. First and second output shafts 20, 21 project forwardly and rearwardly from the gear box 19, respectively. The first or front output shaft 20 has a front output end 20b projecting through a bearing 20a on the lower cross member 1e near its outer end. The second or rear output shaft 21 extends rearwardly over a longer distance and has a rear output end 21b projecting through a bearing 21a on the output shaft supporting portion 1g.

The front wheel 6 and the side wheel 9 can be steered by a steering mechanism as follows: A steering shaft 22a is rotatably disposed in the head tube 1a and has an upper end projecting out of the head tube 1a and joined to a handlebar 22. To the lower end of the steering shaft 22a, there is connected a pitman arm 23 coupled to a front wheel relay rod 24 by a universal joint 23a. A V-shaped link 25 is pivotally mounted by a pivot shaft 25b on the lower cross member 1e and has one end 25a coupled to the relay rod 24 by a universal joint 24a. The other end of the link 25 is coupled by a universal joint 26a to a tie rod 26 connected by a universal joint 26b to the knuckle arm 27 which supports the front wheel 6 and the gear box 18.

The side wheel 9 is vertically swingably supported on the side member 1f by a swing arm 28 having an end 28a pivotally mounted on the front outer side of the side member 1f. The swing arm 28 is of an inverted L shape having a bent outer end on which there is pivotally supported a knuckle arm 29 supporting the hub of the side wheel 9. The knuckle arm 29 is connected by a universal joint 30a to one end of a side wheel tie rod 30. The other end of the tie rod 30 is coupled to the pitman arm 23 by the universal joint 23a. A cushioning unit 31 is interposed between the swing arm 28 and the side member 1f. Alternatively, the side wheel 9 may be supported on a rigid arm with no cushioning means.

As illustrated in FIGS. 1 and 2, a cover 32 is attached to the frame 1 in surrounding relation to the head tube 1a and the upper members 1b, 1b and supports a headlight unit 33 on its front portion. Another cover 34 is disposed around the handlebar 22. A cargo bed 35 is disposed in the space between the front and rear wheels 6, 2 and the side wheel 9. The cargo bed 35 has a floor 35a supported on the lower cross member 1e and the side member 1f, and also has laterally spaced side bars 35b, 35b and a front cover 35c. The cargo bed 35 is disposed between the front and rear wheels 6, 2 and the side wheel 9. The rider's seat 5 is positioned between the front and rear wheels 6, 2 for the rider to ride astride thereof. Since the rider's seat 5 is located on one side of the cargo bed 35, the cargo bed 35 can extend substantially the full longitudinal dimension of the motor vehicle and also substantially the full transverse distance between the front and rear wheels 6, 2 and the side wheel 9. Therefore, the cargo bed 35 can be of a maximum length and width without being limited by the rider, and is relatively large as compared with the outer dimensions of the motor vehicle.

The motor vehicle has a speed change lever 36 operatively coupled to the transmission case 12 for effecting switching between a constant-speed mode of operation in which a governor is used such as when the motor vehicle is used for agricultural work and a normal variable-speed mode of operation in which the motor vehicle is driven to travel or used as a cargo vehicle.

As illustrated in FIG. 3, engine power is transmitted from the transmission case 12 through the propeller shafts 17, 15 to the gear cases 18, 16 for thereby driving the front and rear wheels 6, 2 to enable the motor vehicle to run at various speeds, move, and run at a constant speed. Since both the front and rear wheels 6, 2 are driven, the motor vehicle can run reliably and powerfully for cargo transportation or agricultural work. Attachments can be connected to the output shafts 20, 21 driven by the engine 10 for effecting desired types of work. While the motor vehicle is running, it can be steered by the handlebar 22. The turning movement of the handlebar 22 is transmitted through the steering shaft 22a to the pitman arm 23 and then through the relay rod 24, the link 25, and the tie rod 26 to the knuckle arm 27 for steering the front wheel 6. The pitman arm 23 is also coupled through the tie rod 30 to the knuckle arm 29 of the side wheel 9. By selecting a suitable lever ratio between the relay rod 24 with the tie rod 26 and the tie rod 30, the side wheel 9 can be steered in the same direction through the same angle by the handlebar 22. The steering movement of the front and side wheels 6, 9 in the same direction through the same angle allows the motor vehicle to turn stably with a relatively small radius, making the motor vehicle highly suitable for use as an agricultural working machine.

While an ordinary tire may be mounted on the front wheel 6, it is preferable to mount a low-pressure tire known as a balloon tire on the front wheel 6 in view of operation on rough terrain such as agricultural land, wasteland, sandy ground, and snow-covered land. Where such balloon tires are used, the cushioning units 3, 8, 31 may be dispensed with since the balloon tires themselves have a cushioning ability, and the rear fork 1d, the leading arm 7, and the swing arm 28 may be fixed for a simpler frame mechanism.

Figure 5:
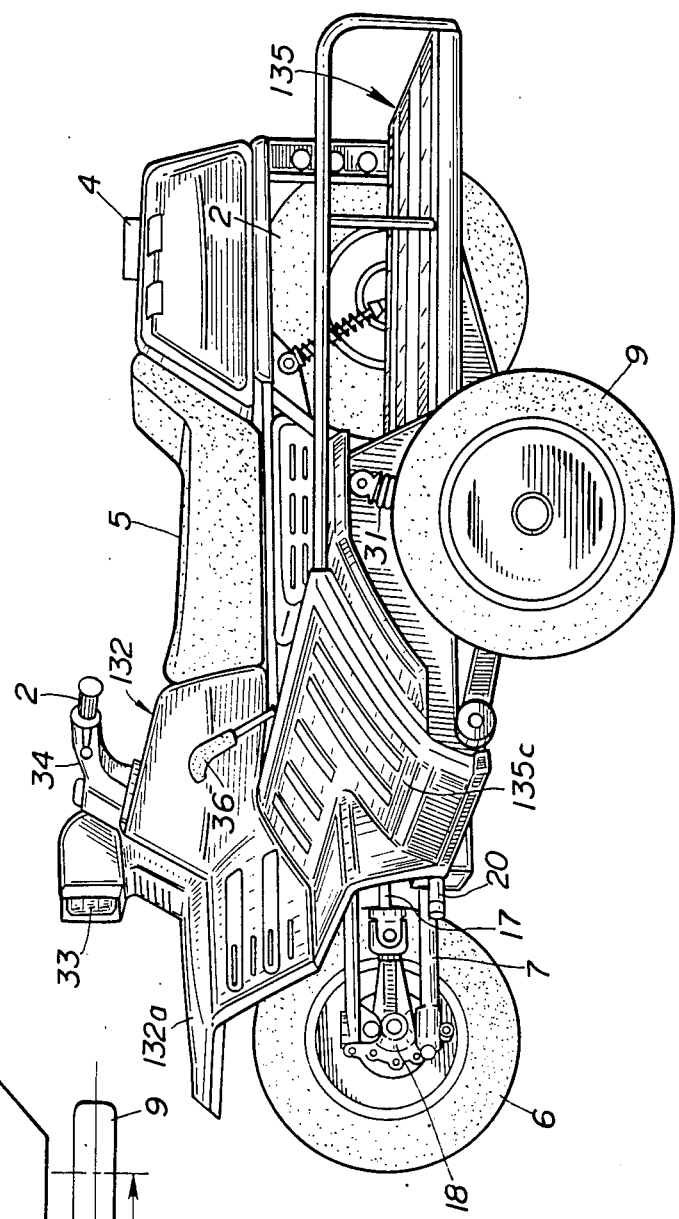
FIG. 5 is a perspective view of a modification of the cargo transportation vehicle shown in FIG. 1.
Figure 6:
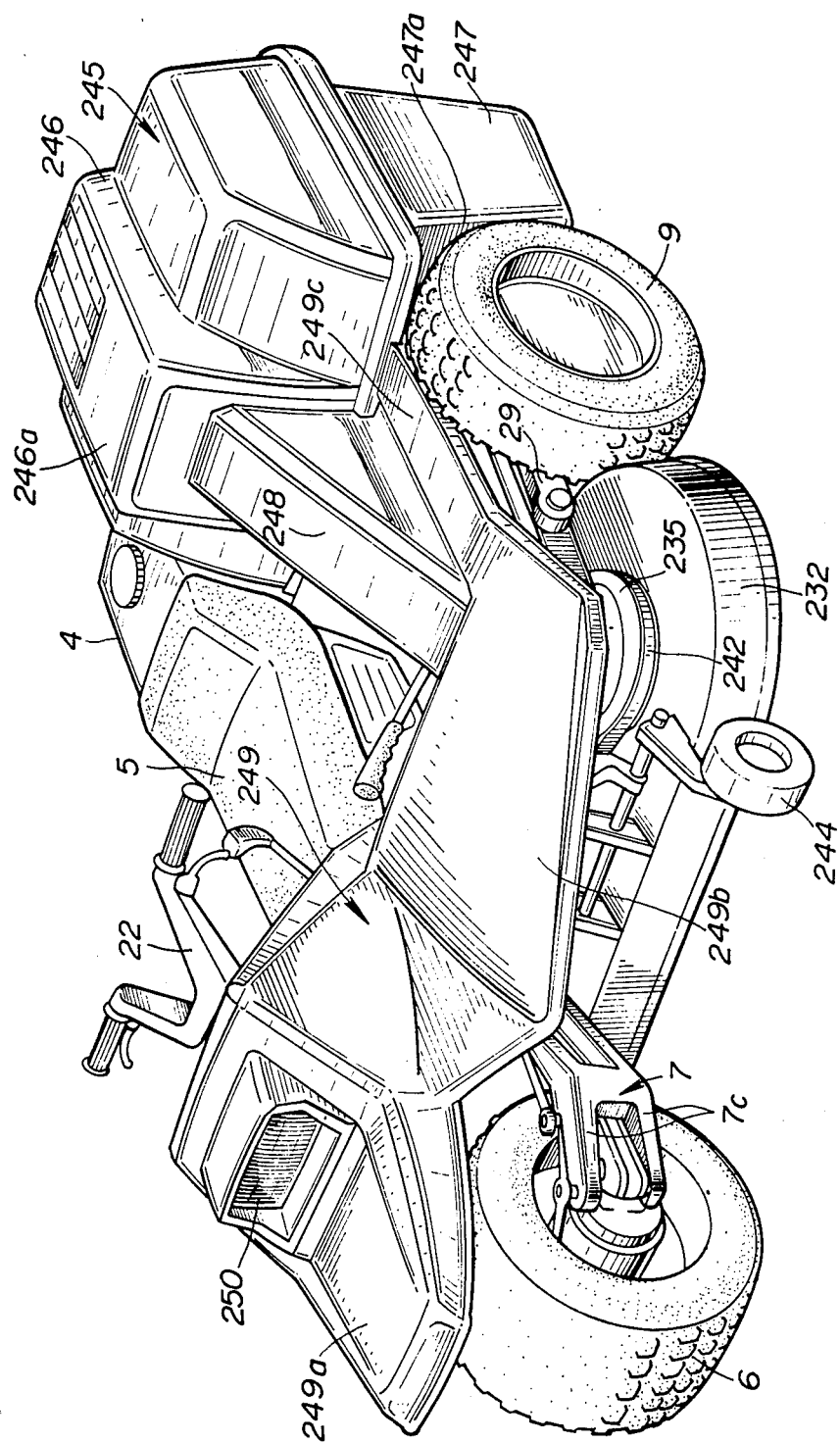
FIG. 6 is a perspective view of a three-wheeled motor vehicle according to a second embodiment of the present invention, the motor vehicle being used as a rider-controlled lawn mower.

FIG. 5 shows a modification of the above first embodiment of the present invention. According to this modification, a front cover 135c of a cargo bed 135 is integrally coupled to a front portion of a frame cover 132 having a fender 132a on its front end. The other structural details are the same as those of the motor vehicle of the first embodiment, and will not be described, with some of them being denoted by the same reference numerals as those shown in FIGS. 1 through 4.

FIGS. 6 through 10 illustrate a motor vehicle as a rider-controlled lawn mower according to a second embodiment of the present invention.

The front and rear wheel drive mechanism, the engine, the transmission case, the steering mechanism, and the frame of the motor vehicle of the second embodiment are identical to or substantially the same as those of the first embodiment, and will not be described in detail. Like components are designated by the same reference characters as in FIGS. 1 through 3.

Figure 7:
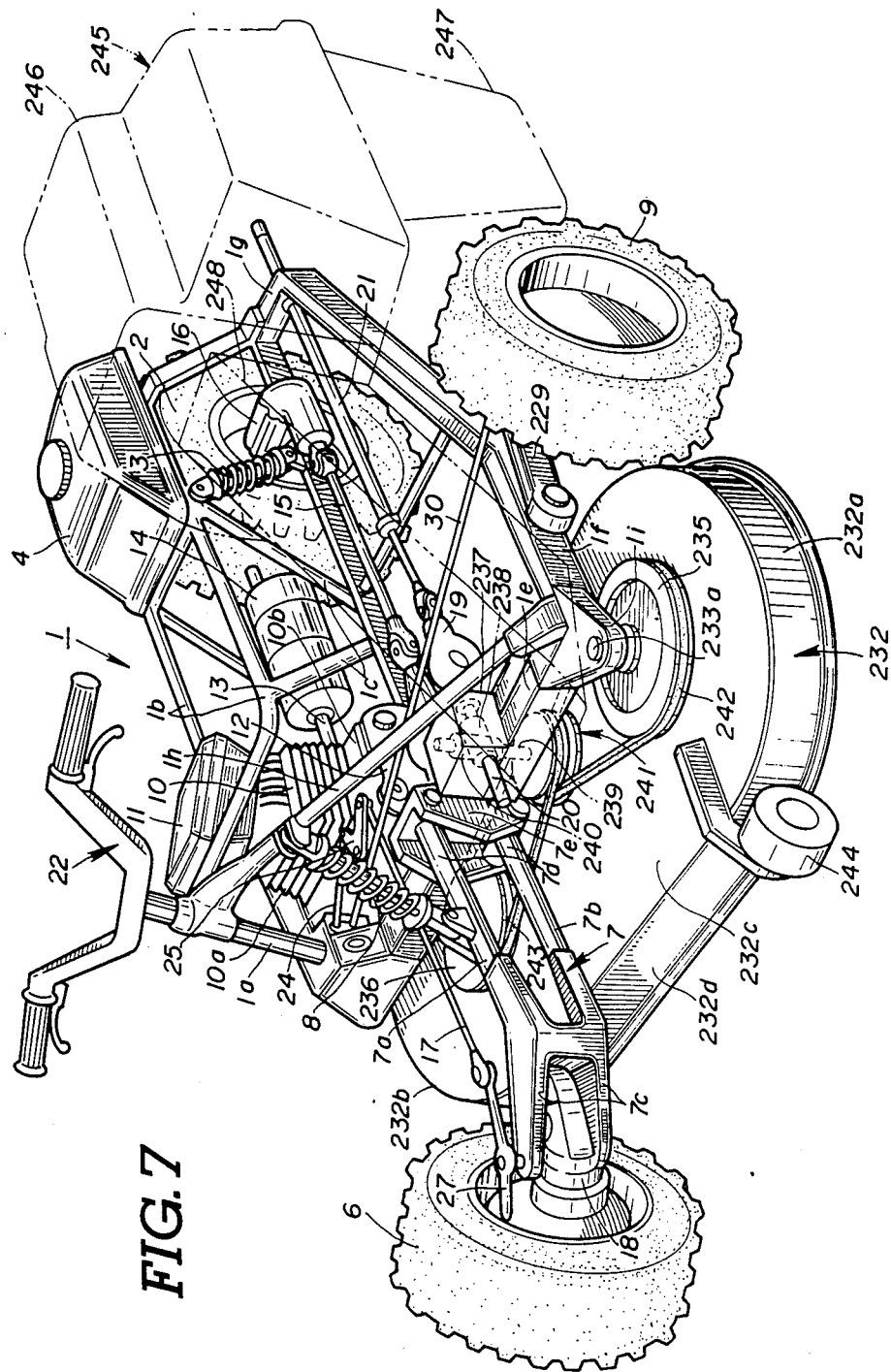
FIG. 7 is a perspective view of the three-wheeled motor vehicle of FIG. 6, with a cover, a grass bag, and a duct omitted from illustration.
Figure 8:
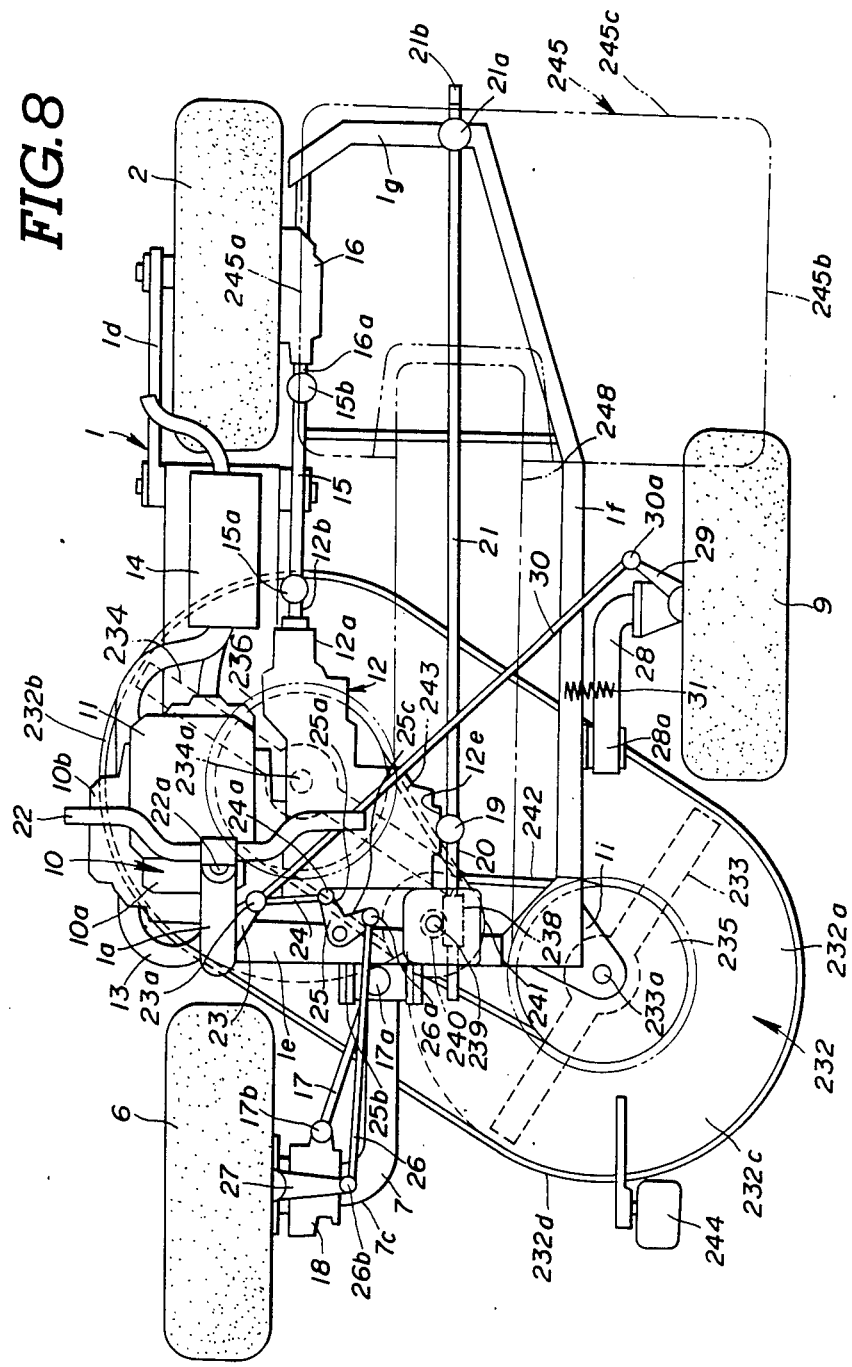
FIG. 8 is a plan view similar to FIG. 3, showing a drive mechanism of the motor vehicle of FIG. 6.

As shown in FIGS. 7 and 8, a cutter housing 232 is disposed below the frame 1 and supported by the frame 1. The cutter housing 232 is of a substantially elliptical shape having straight intermediate sides. The cutter housing 232 has an end 232a positioned in front of the side wheel 9 and the opposite end 232b located between the front and rear wheels 6, 2. Thus, the cutter housing 232 lies obliquely, as seen in plan, with respect to the longitudinal axis of the motor vehicle. The cutter housing 232 includes a top wall 232c, a peripheral wall 232d, and an open bottom. Two cutter blades 233, 234 rotatable in a horizontal plane are accommodated in the cutter housing 232 respectively at opposite portions thereof, the cutter blades 233, 234 being rotatable out of phase with each other so that they will not interfere with each other during rotation. The cutter blades 233, 234 have respective shafts 233a, 234a with ends projecting upwardly through the top wall 232c and connected to pulleys 235, 236, respectively, which are vertically displaced one from the other by a distance equal to the width of a belt (described hereinbelow). The shaft 233a has its upper end supported by a bracket 1i mounted on the lower cross member 1e, and the shaft 234a has its upper end similarly supported, although not shown.

A gear box 237 is mounted on an intermediate portion of the lower cross member 1e. The output shaft 20 extends through the gear box 237 and has a worm gear 238 disposed in the gear box 237 and held in mesh with a worm gear 240 mounted on a shaft 239 extending vertically in perpendicular relation to the output shaft 20. The shaft 239 extends downwardly from the gear box 239 through the lower cross member 1e and is connected at its lower end to a two-groove pulley 241 having upper and lower grooves of the same diameter. Belts 242, 243 are trained around the pulleys 235, 236, respectively, and the grooves of the pulley 241. Therefore, when the output shaft 20 is driven to rotate, the pulley 241 is rotated to cause the belts 242, 243 and the pulley 235, 236 to rotate the cutter blades 233, 234 for cutting grass. A guide roller 244 is attached to the cutter housing 232 and extends forwardly from one side of the cutter housing 232 for contact with the ground.

A grass bag 245 is disposed behind the cutter housing 232 for accommodating grass clippings. The grass bag 245 is located sideways of the rear wheel 2 behind the side wheel 9. The grass bag 245 is rectangular in shape as seen in plan, and has one side 245a positioned just inwardly of the rear wheel 2 and the opposite side 245b positioned directly behind the side wheel 9 and lying flush with or slightly inwardly of the outer side of the side wheel 9. The grass bag 245 has a rear side 245c lying substantially flush with the rear end of the rear wheel 2. The grass bag 245 comprises upper and lower members 246, 247. The lower member 247 has a front side 247a (FIG. 6) slanted downwardly and rearwardly so as not to interfere with the side wheel 9. The grass bag 245 is supported on the rear portion of the frame 1. To the front side of an intermediate portion 246a of the upper member 246, there is connected the rear end of a duct 248 extending obliquely downwardly in the forward direction and having its front end coupled to an intermediate portion of the cutter housing 232.

The frame 1 is surrounded by a cover 249 including a front fender 249a extending in covering relation to the front wheel 6. The cover 249 also has a front cover 249b covering the cutter housing 232 and a side cover 249c extending rearwardly from the outer end of the front cover 249b and between the side wheel 9 and the duct 248. The cover 249 supports a headlight unit 250 in front of the handlebar 22.

The motor vehicle runs when the front and rear wheels 6, 2 are driven to rotate, while the side wheel 9 rolls on the ground. Also during this time, the cutter blades 233, 234 are rotated to cut grass, and the grass clippings are delivered through the duct 248 into the grass bag 245 in which the grass clippings are stored.

Although the front and rear wheels 6, 2 are shown as being driven at the same time, only the rear wheel 2 may be driven. Similarly, the cutter housing may accommodate only one cutter blade rather the illustrated two cutter blades.

Figure 9:
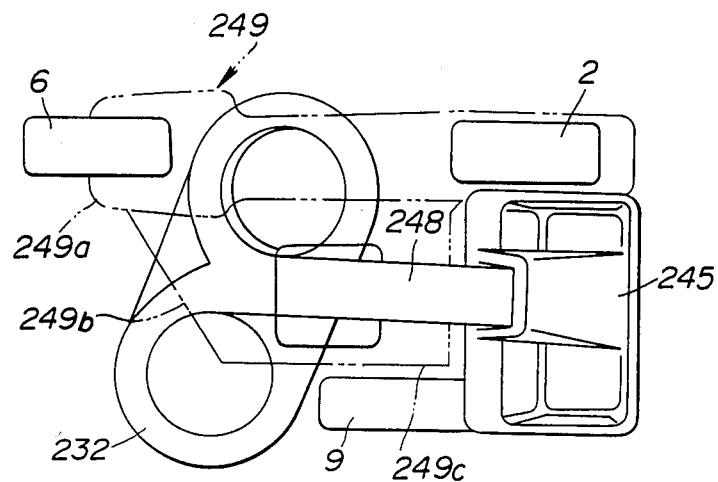
FIG. 9 is a plan view illustrating the relationship between the three wheels and a working machine comprising a cutter housing, the grass bag, and the duct in the embodiment of FIG. 6.
Figure 10:
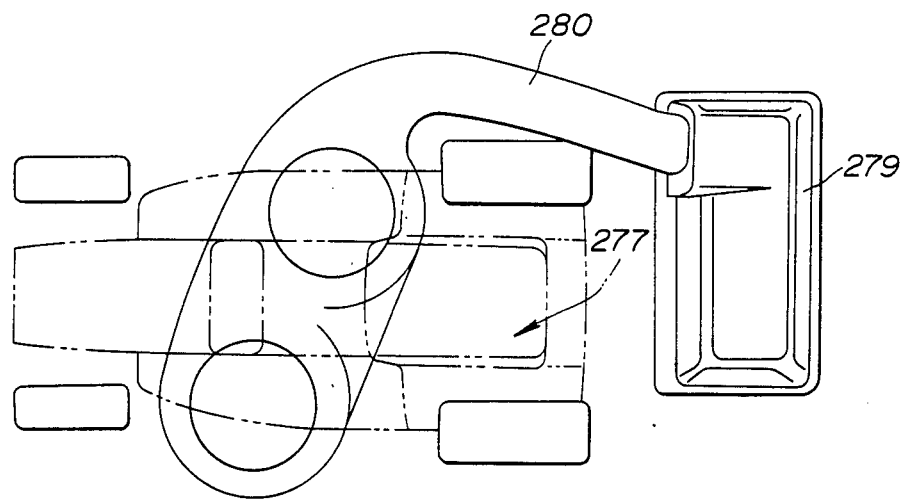
FIG. 10 is a plan view similar to FIG. 9, but showing a conventional four-wheeled rider-controlled lawn mower.

As can be understood from FIG. 9, the operator rides on the motor vehicle between the front and rear wheels 6, 2, and the cutter housing 232, while the cutter housing 232 is positioned in the space between the front and rear wheels 6, 2 and the side wheel 9. Since the operator is positioned sideways of this space, that portion of the space behind the cutter housing 232 is open and available for the grass bag 245 to be located herein. The result of this arrangement is that the duct 248 interconnecting the cutter housing 232 and the grass bag 245 is disposed substantially centrally of the motor vehicle in the transverse direction thereof. Therefore, the grass bag 245 is contained within the dimensions of the motor vehicle without projecting rearwardly or laterally thereof. A conventional four-wheeled, rider-controlled lawn mower is comparatively shown in FIG. 10. According to such known configurations, a grass bag 249 projects rearwardly from the motor vehicle 277 and a duct 280 projects laterally of the motor vehicle 277. According to the present invention, the cutter housing, the grass bag, and the duct, which are of the same capacities or sizes as those of the conventional designs, can be contained in the longitudinal and transverse dimensions of the motor vehicle, so that the outer shape of the motor vehicle is compact and small in size while maintaining desired functions.

Figure 11:
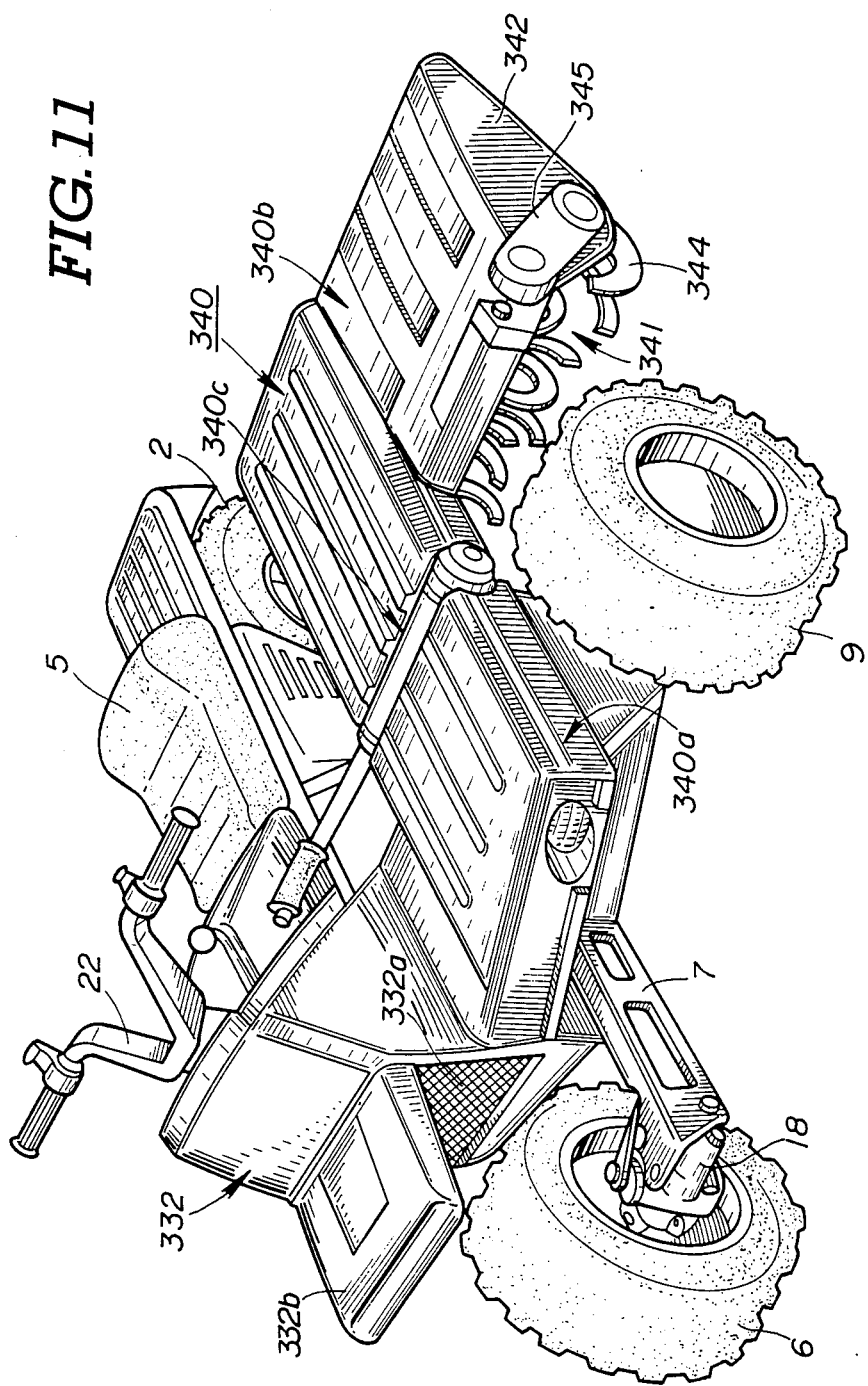
FIG. 11 is a perspective view of a three-wheeled motor vehicle according to a third embodiment of the present invention, the motor vehicle being used as a rider-controlled agricultural working machine.
Figure 12:
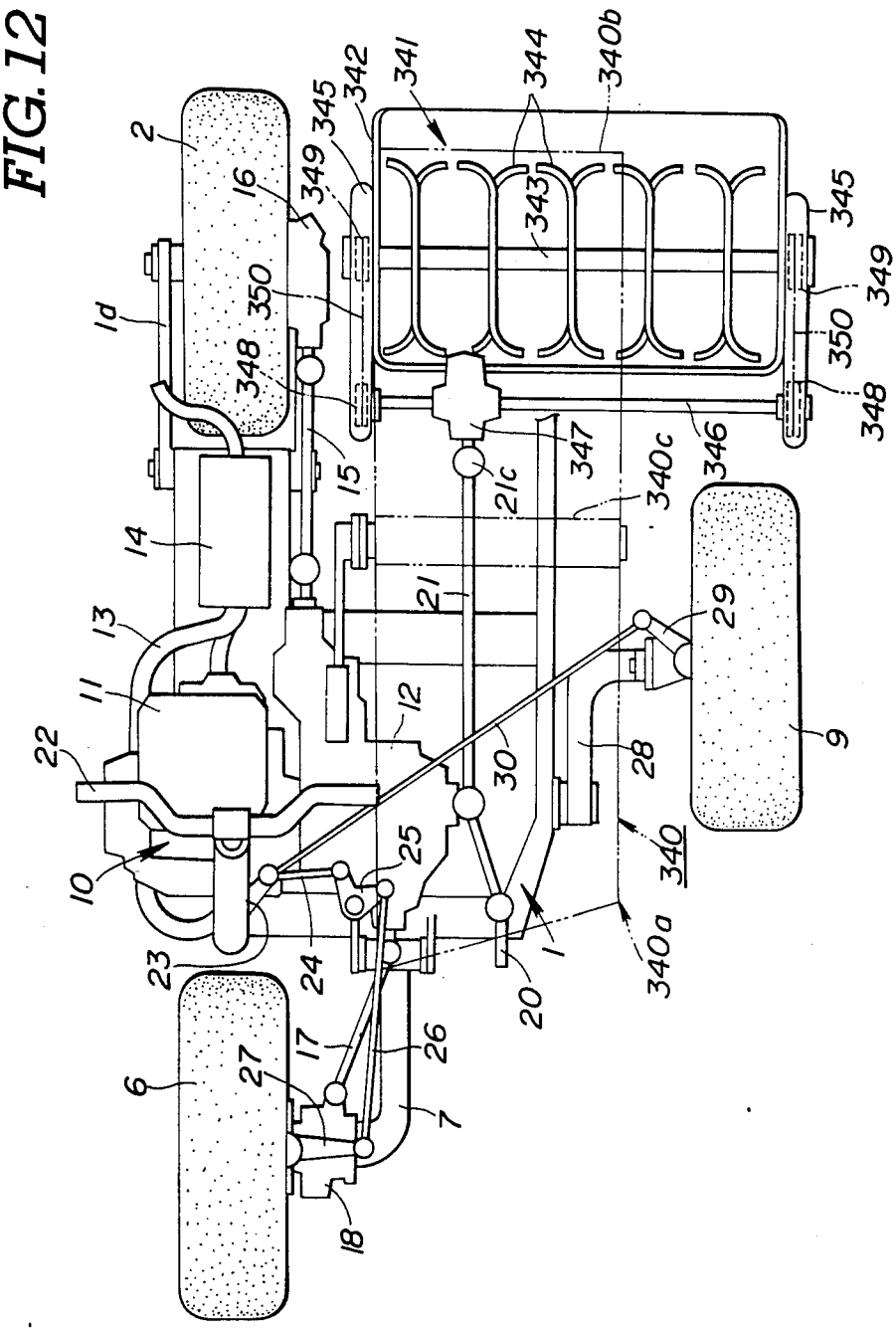
FIG. 12 is a plan view similar to FIG. 3, primarily showing a drive mechanism of the motor vehicle of FIG. 11.

FIGS. 11 and 12 show a three-wheeled motor vehicle used as an agricultural working machine according to a third embodiment of the present invention.

The front and rear wheel drive mechanism, the engine, the transmission case, the steering mechanism, and the frame of the motor vehicle of the third embodiment are also identical to or substantially the same as those of the first embodiment, and will not be described in detail. Like components are designated by the same reference characters as in FIGS. 1 through 3.

According to the third embodiment, the front and rear wheels 6, 2 and the side wheel 9 have balloon tires capable of gripping the ground and running reliably thereon when running and moving over agricultural land, and are supported by suspensions with no cushioning units. The rear fork 1d, the leading arm assembly 7, and the swing arm 28 are fixed to the frame 1. To provide for maneuvering on agricultural land, a screen 332a is disposed on a lower portion of a cover 332 for preventing mud from being attached to the engine 10, and the cover 332 has a raised front fender 332b.

A cultivating unit 340 is disposed in the space between the front and rear wheels 6, 2 and the side wheel 9 for forming furrows in the field or breaking up the soil surface. The cultivating unit 340 has a rotor 341 composed of a plurality of blades 344 spaced axially and mounted on a drive shaft 343 supported horizontally in a case 342 opening downwardly, forwardly, and rearwardly. The blades 344 are arranged on one side of the rear wheel 2 toward the outer side of the side wheel 9. Therefore, the width of a strip of ground which can be cultivated at one time by the cultivating unit 340 is increased. Speed reducer cases 345, 345 are mounted on the opposite sides of the case 342 and support on their front ends a transmission shaft 346 extending between the speed reducer cases 345, 345. The transmission shaft 346 is operatively coupled by a gear box 347 and a universal joint 21c to the rear output shaft 21. The gear box 347 houses bevel gears (not shown) for driving the transmission shaft 346. Opposite ends of the transmission shaft 346 are disposed in the speed reducer cases 345, 345, respectively, and have sprockets 348, 348 which are operatively coupled by chains 350, 350 to sprockets 349, 349 mounted on the drive shaft 343. Therefore, the rotor 341 can be driven to rotate by the output shaft 21. The mechanism for transmitting engine power to the rotor 341 is not limited to the illustrated structure, but may be of other designs.

The cultivating unit 340 has a front portion 340a fixed to the frame 1 and a rear portion 340b accommodating the rotor 341 and vertically pivtally supported by a hinge 340c. When working on the land, the rear portion 340b is lowered to bring the rotor 341 into contact with the ground. When the working machine is to be moved from one placed to another, the rear portion 340b is raised to lift the rotor 341 out of contact with the ground.

By installing the agricultural attachment or cultivating unit 340, the working machine can cultivate the land. During cultivating operation, the operator rides on the rider's seat 5 out of interference with operation of the cultivating unit 340, which is located between the rider's seat 5 and the outer side of side wheel 9. Since the front and rear wheels 6, 2 travel in substantially the same path on the ground and the side wheel 9 is spaced laterally from the front and rear wheels 6, 2, the rotor 341 operates between the front and rear wheels 6, 2 and the side wheel 9 to cultivate the land therebetween and behind the side wheel 9. In this manner the wheels 6, 2, 9 do not interfere with the cultivated soil. As the rider rides on one side of the cultivating unit soil. As the rider rides on one side of the cultivating unit 340, rather than in front thereof, the working machine need only be of a longitudinal dimension required to accommodate the cultivating unit 340. Therefore, the rider-controlled working machine is of a compact outer shape while ensuring practically sufficient functions thereof. The working machine can make small turns and hence can be easily maneuvered in various directions because the front and side wheels 6, 9 are steerable. The front and rear wheels 6, 2 which are drivable by the engine 10 enable the working machine to run reliably and powerfully on rough terrain. Therefore, the small-sized rider-controlled agricultural working machine of the present invention provides good performance and good operating functions. While the illustrated agricultural working machine serves as a cultivator, it may also be used as a seeding machine, a fertilizer sprinkling machine, or an antiseptic spraying machine.

Figure 13:
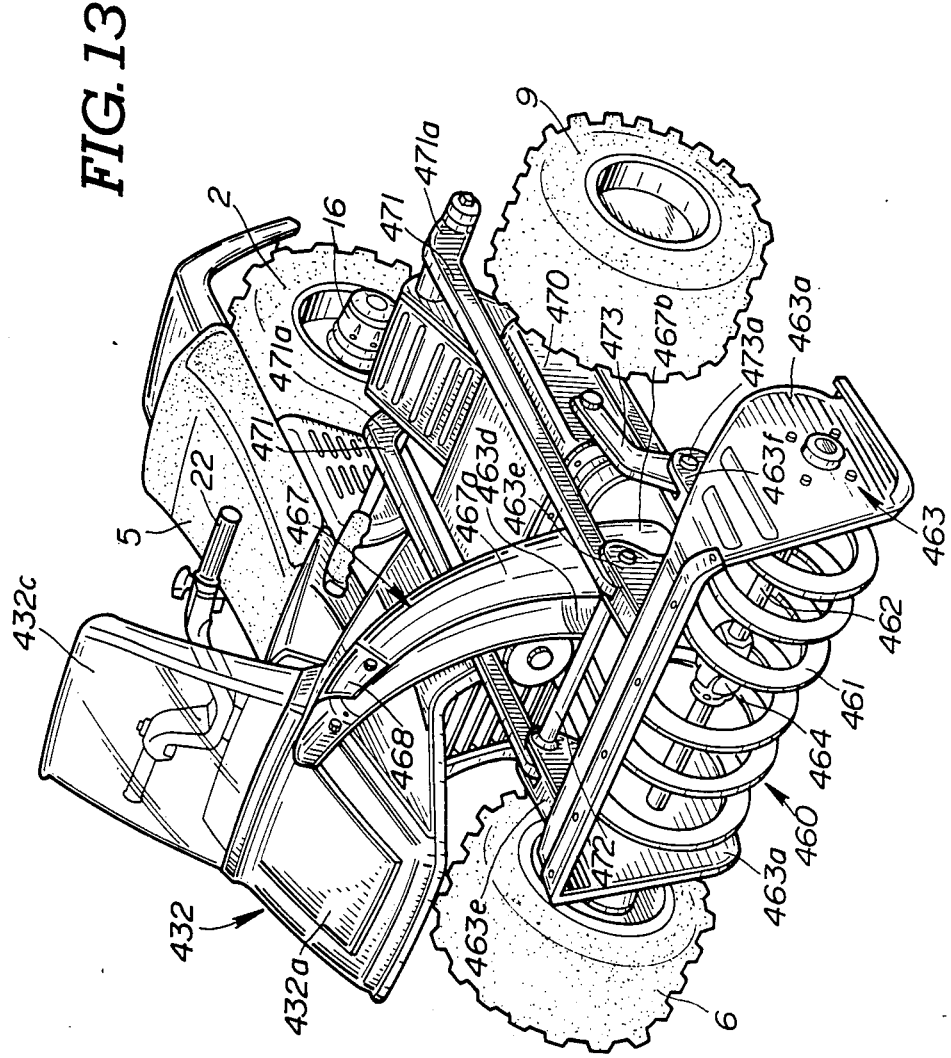
FIG. 13 is a perspective view of a three-wheeled motor vehicle according to a fourth embodiment of the present invention, the motor vehicle being used as a rider-controlled snowplow.
Figure 14:
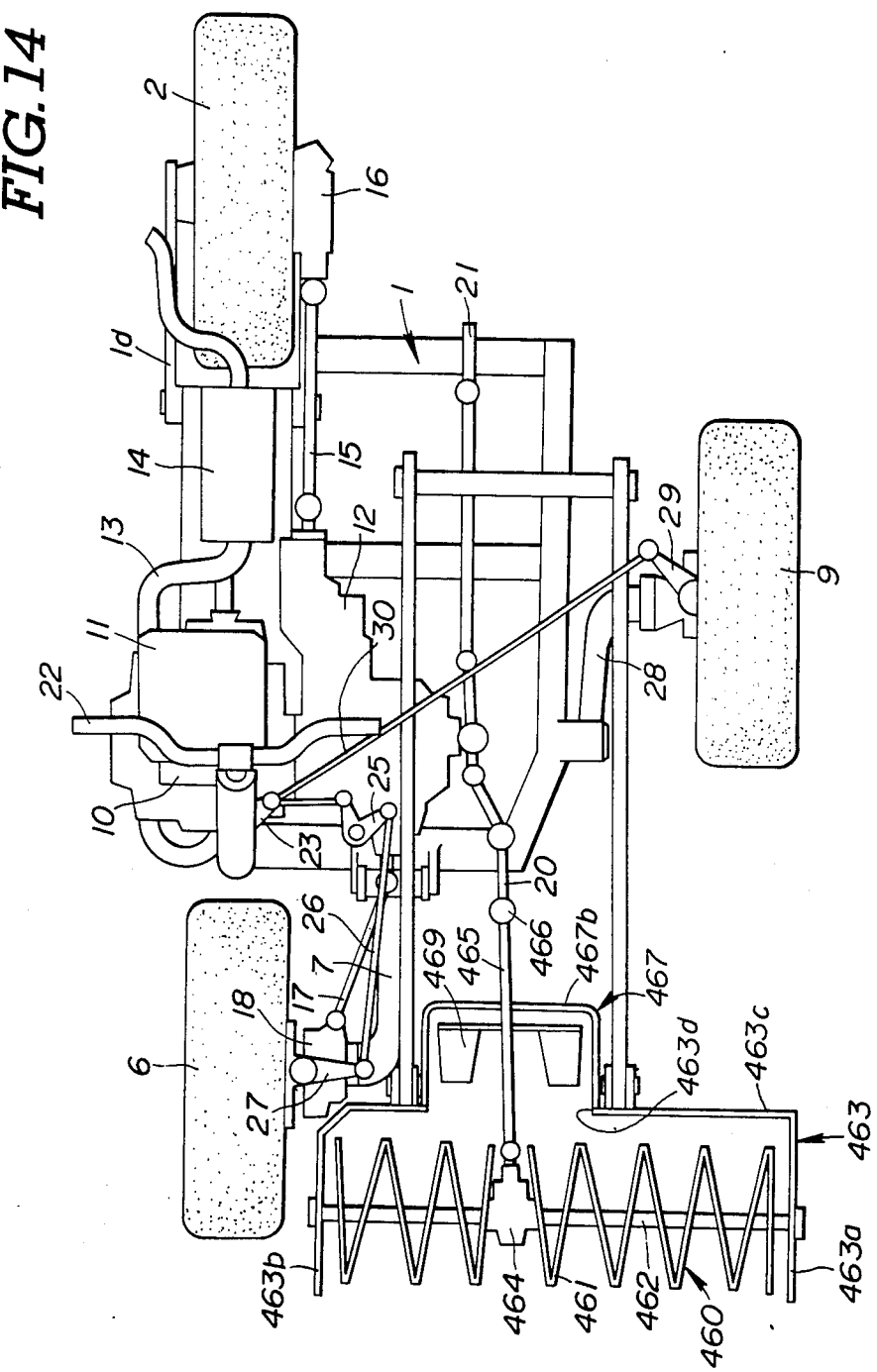
FIG. 14 is is a plan view similar to FIG. 3, primarily showing a drive mechanism of the motor vehicle of FIG. 13.

FIGS. 13 and 14 illustrate a three-wheeled motor vehicle employed as a rider-controlled snowplow according to a fourth embodiment of the present invention. The front and rear wheel drive mechanism, the engine, the transmission case, the steering mechanism, and the frame of the motor vehicle of the fourth embodiment are also identical to or substantially the same as those of the first embodiment, and will not be described in detail. Like components are designated by the same reference characters as in FIGS. 1 through 3.

In the fourth embodiment, the front and rear wheels 6, 2 and the side wheel 9 have balloon tires for runing over snow-covered land, and are supported by suspensions with no cushioning units. The rear fork 1d, the leading arm assembly 7, and the swing arm 28 are fixed to the frame 1.

A snowplow unit 460 is positioned in the space between the front and rear wheels 6, 2 and the side wheel 9. As shown in FIG. 14, the snowplow unit 460 includes an auger 461 disposed laterally inwardly of the front wheel 6 in the space between the front wheel 6 and the outer side of the side wheel 9. The auger 461 is supported on a shaft 462 and extending transversely of the snowplow. The auger 461 has an outer end positioned in front of the side wheel 9. The shaft 462 is rotatably supported on opposite flanges 463a, 463b of a cover 463, which cover has open front and lower portions. The shaft 462 is operatively coupled by a gear box 464 on its intermediate portion through a drive shaft 465 extending longitudinally and perpendicularly to the shaft 462. The drive shaft 465 is coupled to the output shaft 20 by a universal joint 466. Thus, when the engine 10 is operated, the shaft 465 is driven to cause the gear box 464 to rotate the auger shaft 462. The auger 462 is then driven to gather snow rearwardly into a central position while the snowplow is in motion.

As shown in FIG. 13, the cover 463 has a duct 467 on its central back portion, the duct 467 extending upwardly and supporting a snow-discharging guide 468 angularly adjustably on its upper end. The duct 467 includes an intermediate and upper portion 467a angularly movable with respect to a lower portion 467b. A snow-discharging blower 469 is mounted on the drive shaft 465 behind a rear wall 463c of the cover 463. The blower 469 is positioned in the lower portion 467b of the duct 467 which is held in communication with the rear wall 463c through an opening 463d. When the auger 461 is rotated, the blower 469 is also rotated to discharge snow gathered by the auger 461 through the duct 467.

Two laterally spaced brackets 463e, 463e are mounted on the upper portion of the rear wall 463c of the cover 463. Two rods 471, 471 have front ends pivotally mounted respectively on the brackets 463e, 463e by a shaft 472 and rear ends 471a, 471a pivotally connected to the rear end of a base 470 of the snowplow unit 460 mounted on the frame 1. Laterally spaced lift arms 473 on the front portion of the base 470 have front ends pivotally coupled by pivot shafts 473a to bracketks 463f mounted on the rear wall 463c of the cover 463, and are positioned outwardly of the brackets 463e, respectively. When the lift arms 473 are driven to move angularly, the unit composed of the auger 461, the cover 463, the blower 469, the duct 467, and the shaft 465 can be lifted so that they will not interfere with movement of the snowplow from one place to another.

The rider-controlled snowplow, which is of a compact size and capable of functioning well, can be easily assembled simply by changing the plow attachment on its front end. A frame cover 432 includes a high front fender 432a and a windshield 432c positioned in front of the handlebar 22.

FIG. 15 shows a three-wheeled motor vehicle constructed as a snowmobile according to a fifth embodiment of the present invention. The front and rear wheel drive mechanism, the engine, the transmission case, the steering mechanism, and the frame of the motor vehicle of the fifth embodiment are also identical to or substantially the same as those of the first embodiment, and will not be described in detail. Like components are designated by the same reference characters as in FIGS. 1 through 3.

The illustrated snowmobile has a side ski 509 instead of the side wheel. The ski is supported by a knuckle 529 on a swing arm 528 and operatively connected to a tie rod 530, so that the side ski 509 and the front wheel 6 can be steered at the same time. A cushioning unit 531 is connected between the side ski 509 and an arm 502 projecting from the frame. The side ski 509 is vertically angularly movable about a pivot shaft 509a while being dampened by a damper 509b.

A passenger's seat 590 is mounted centrally on a cargo bed 535 with a cargo storage space 535a left behind the seat 590. A front cover 592 is disposed on the front end of the cargo bed 535 and includes a windshield 591. A frame cover 532 also has a windshield 532c.

The snowmobile thus constructed allows cargo and a passenger to be carried thereon.

FIGS. 16 and 17 show a modification in which the engine is differently installed. In this modification, only the engine is in a different position. The front and rear wheel drive mechanism, the engine, the transmission case, the steering mechanism, and the frame of the motor vehicle of this modified embodiment are also identical to or substantially the same as those of the first embodiment, and will not be described in detail. Like components are designated by the same reference characters as in FIGS. 1 through 3.

An engine 610 is installed in the space between the front and rear wheels 6, 2 and the side wheel 9 and located inwardly of the side wheel 9. The engine 610 has a cylinder portion 610a and a crankcase 610b therebelow, there being a transmission case 612 located inwardly of the crankcase 610b. A propeller shaft 615 extends rearwardly from the transmission case 612 for transmitting engine power to the gear box 16 operatively coupled to the rear wheel 2. Another propeller shaft 17 projects forwardly from the transmission case 612 for transmitting engine power to the gear box 18 operatively coupled to the front wheel 6. The engine 610 has an exhaust pipe 613 extending rearwardly and connected to a muffler 614.

An engine hood 691 is disposed inwardly of a frame cover 632, and a cargo bed 635 extends rearwardly from the engine hood 691. The engine hood 691 has an air inlet 692 comprising a screen mesh and a headlight unit 693 positioned laterally of the air inlet 692. The illustrated three-wheeled motor vehicle serves as a cargo transportation vehicle.

The engine may therefore be located between the front and rear wheels 6, 2 and the side wheel 9. While the illustrated motor vehicle is a cargo transportation vehicle, it may be an agricultural working machine, a snowplow, a lawn mower or a snowmobile.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. A motor vehicle comprising:
   a steering handle;
   a rider's seat disposed behind said steering handle;
   a front wheel disposed in front of said steering handle and steerable by the steering handle;
   a rear wheel disposed behind said rider's seat and substantially aligned with said front wheel along an axis;
   an engine for driving at least said front and rear wheels;
   a side runner disposed between said front and rear wheels as seen in side elevation and spaced transversely from said axis;
   a steering mechanism for steering said side runner in coaction with said front wheel; and
   a structural body supporting said front and rear wheels of said side runner and defining a space located between said axis and said side runner and opening in the longitudinal direction of the motor vehicle.

2. A motor vehicle according to claim 1, wherein said engine is disposed between said front and rear wheels.

3. A motor vehicle according to claim 2, further including a power transmission device operatively coupled with said engine and having a transmission case disposed adjacent to said engine closely to said side runner, and a propeller shaft extending from said transmission case and operatively coupled to said front and rear wheels.

4. A motor vehicle according to claim 1, wherein said engine is disposed between said axis and said side runner.

5. A motor vehicle according to claim 4, further including a power transmission device operatively coupled with said engine and having a transmission case disposed adjacent to said engine closely to said axis, and a propeller shaft extending from said transmission case and operatively coupled to said front and rear wheels.

6. A motor vehicle according to claim 1, further including a cargo bed mounted on said structural body.

7. A motor vehicle according to claim 1, further including a passenger seat and a cargo bed mounted on said structural body.

8. A motor vehicle according to claim 1, further including a power transmission device operatively coupled with said engine and having an output shaft means disposed between said axis and said side runner for connection to a working unit.

9. A motor vehicle according to claim 8, wherein said output shaft means extends in said longitudinal direction.

10. A motor vehicle according to claim 9, wherein said output shaft includes a shaft means extending forwardly of the motor vehicle and a shaft extending rearwardly of the motor vehicle.

11. A motor vehicle according to claim 8, including the working unit supported on said structural body and drivable by said engine through said output shaft means.

12. A motor vehicle according to claim 11, wherein said working unit comprises a lawn mower unit.

13. A motor vehicle according to claim 11, wherein said working unit comprises a cultivating unit.

14. A motor vehicle according to claim 11, wherein said working unit comprises a snowplow unit.

15. A motor vehicle according to claim 1, wherein said side runner comprises a wheel rotatably mounted on said structural body.

16. A motor vehicle according to claim 1, wherein said side runner comprises a ski mounted on said structural body.

* * * * *

UNITED STATES PATENT AND TRADEMARK OFFICE
CERTIFICATE OF CORRECTION

PATENT NO. : 4,690,235
DATED : September 1, 1987
INVENTOR(S) : Shinichi MIYAKOSHI It is certified that error appears in the above-identified patent and that said Letters Patent is hereby corrected as shown below:

```
Column 1, line 31, change "as" to --at--.
Column 3, line 56, change "if" to --1f--.
          line 58, change "if" to --1f--.
Column 4, line 59, change "rearwheel" to --rear wheel--.
Column 9, lines 30-31, delete sentence "As the rider
rides on one side of the cultivating unit soil."
```

Column 12, line 4, change "from" to --front--.

Signed and Sealed this

Fifth Day of April, 1988

Attest:

DONALD J. QUIGG

*Attesting Officer*

*Commissioner of Patents and Trademarks*